US 6,744,732 B1

(12) United States Patent
Pfenning et al.

(10) Patent No.: US 6,744,732 B1
(45) Date of Patent: Jun. 1, 2004

(54) DYNAMIC THROUGHPUT ALLOCATION IN A CONVERGED VOICE/DATA SERVICES NETWORK INTERFACE

(75) Inventors: Jorg-Thomas Pfenning, Redmond, WA (US); Jameel Hyder, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/515,488

(22) Filed: Feb. 29, 2000

(51) Int. Cl.[7] .................. H04L 12/26; H04L 12/66; H04L 12/56
(52) U.S. Cl. .................. 370/235; 370/352; 370/401
(58) Field of Search .................. 370/352, 353, 370/294, 295, 401, 465, 493, 490, 437, 229, 230, 468, 235, 232; 709/104, 102, 105, 226, 229

(56) References Cited

U.S. PATENT DOCUMENTS

| 5,521,906 A | * | 5/1996 | Grube et al. | 370/252 |
| 5,881,050 A | * | 3/1999 | Chevalier et al. | 370/230 |
| 6,285,748 B1 | * | 9/2001 | Lewis | 370/229 |

OTHER PUBLICATIONS

NetRunner 75E, http://www3.nortelnetworks.com/product/75E.html [web page] (1997).
Net Runner 75E Technical Information, http://www3.nortelnetworks.com/product/75Etech.html [web page] (1997).

* cited by examiner

Primary Examiner—Chau Nguyen
Assistant Examiner—Soon-Dong Hyun
(74) Attorney, Agent, or Firm—Leydig, Voit & Mayer, Ltd.

(57) ABSTRACT

A dynamic throughput allocation method and framework are disclosed. The method includes initially providing an interface having a finite throughput. The data calls are allocated varying portions of the connection's available throughput. A throughput allocation server assigns portions of the finite throughput supported by the interface to connections between ones of a set of internal nodes and ones of a set of external nodes connected to ones of the set of internal nodes. The throughput allocation server includes a table describing the portions of the finite throughput assigned to each one of the connections. A throughput allocation controller monitors the available throughput. When under heavy usage, the throughput allocation controller determines that available throughput is less than a minimum desired value, and in response de-allocates a portion, but not all, of the throughput previously allocated to at least one data call.

21 Claims, 4 Drawing Sheets

DYNAMIC THROUGHPUT ALLOCATION IN A CONVERGED VOICE/DATA SERVICES NETWORK INTERFACE

AREA OF THE INVENTION

The present invention generally relates to the area of integrated communications network and more particularly to methods and mechanisms for controlling connections on one or more physical links supporting both fixed throughput (voice/video) and variable throughput (data) connections between an external network and a set of end nodes on an internal network.

BACKGROUND OF THE INVENTION

Historically, businesses with external data links have included at least two separate and distinct sets of physical communications lines to their places of business. A first set of lines provide communication links between a public switched telephone network (PSTN) and a private branch exchange (PBX) system including phones and other telephony. A set of PSTN lines terminate at a business site at a PBX connected to a business' internal phone lines. A second set of lines provide links between external data networks and internal local area networks (LANs) for the businesses. Examples of such lines are T1, E1, ISDN, PRI, and BRI. One may add a third line for supporting reception and/or transmission of video signals.

Certain inefficiencies may arise from maintaining two or more separate networks in a place of business—one for voice calls and/or video calls, and the other for data calls. A first inefficiency is the increase in network hardware needed to accommodate the two physically separate line groups. A second inefficiency arises from the inability to share excess capacity that arises in a first line group with a second line group when a need arises for additional throughput on the second line group.

In recognition of the potential efficiencies arising from converging two physically and operationally distinct networks into a single network, the network technology industry has sought to define and implement a single, converged, network meeting the demands for all types of communications including voice, facsimile, data, etc. As a result, a new telephony/data transmission paradigm is emerging. The new paradigm is based upon a packet-based, switched, multimedia network. Data and voice, while treated differently at the endpoints by distinct applications, share a common transport mechanism.

When implemented, the new network communications standards and protocols will enable businesses to determine their total required communications throughput and base their leasing/purchasing decisions on the total need rather than purchasing/leasing distinct lines for specific operations. In addition to potentially reducing the amount of "wire" in the office or place of business, a business may increase the total pool of communications throughput at a lower cost than purchasing/leasing specific-purpose lines.

SUMMARY OF THE INVENTION

In recognition of the shortcomings of the prior software distribution facilities, a dynamic throughput allocation method is presented as well as a framework for carrying out the dynamic throughput allocation method. Throughput is a generic term referring to the total communications flow capabilities of a system, such as an interface between an external and internal network. For example, in a frequency divided communications interface, the throughput can be expressed in the total communications flow that is handled in a set of frequency divided channels serviced by the communications interface. Alternatively, in a time divided communications interface, the throughput can be expressed in the total communications flow that is handled by a set of time divided frames.

The method includes initially providing a network interface having a finite throughput. Data calls are allocated varying portions of the interface's available throughput. In an embodiment of the present invention, an external link connected to the network interface supports voice and data calls, and may even carry video signals.

During the course of operation of the interface, a throughput allocation server assigns portions of the finite throughput supported by the interface to connections between ones of a set of internal nodes connected to an internal network and ones of a set of external nodes connected to ones of the set of internal nodes via the external link. While voice/video calls are typically assigned only a single channel or fixed portion of the throughput supported by the interface, data calls utilize portions of the throughput having a variable magnitude. In order to track the assigned portions of the total available throughput, the throughput allocation server includes a table describing the portions of the finite interface throughput assigned to each one of the connections. A throughput allocation controller monitors the available throughput.

When under heavy usage, such as simultaneously running a number of multimedia data calls, the throughput allocation controller determines that available (free) throughput is less than a minimum desired value, and in response de-allocates a portion, but not all, of the throughput previously allocated to at least one data call. The de-allocated portion is then returned to a pool of available (free) throughput of the communications interface.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF A PREFERRED EMBODIMENT

Figure 1:
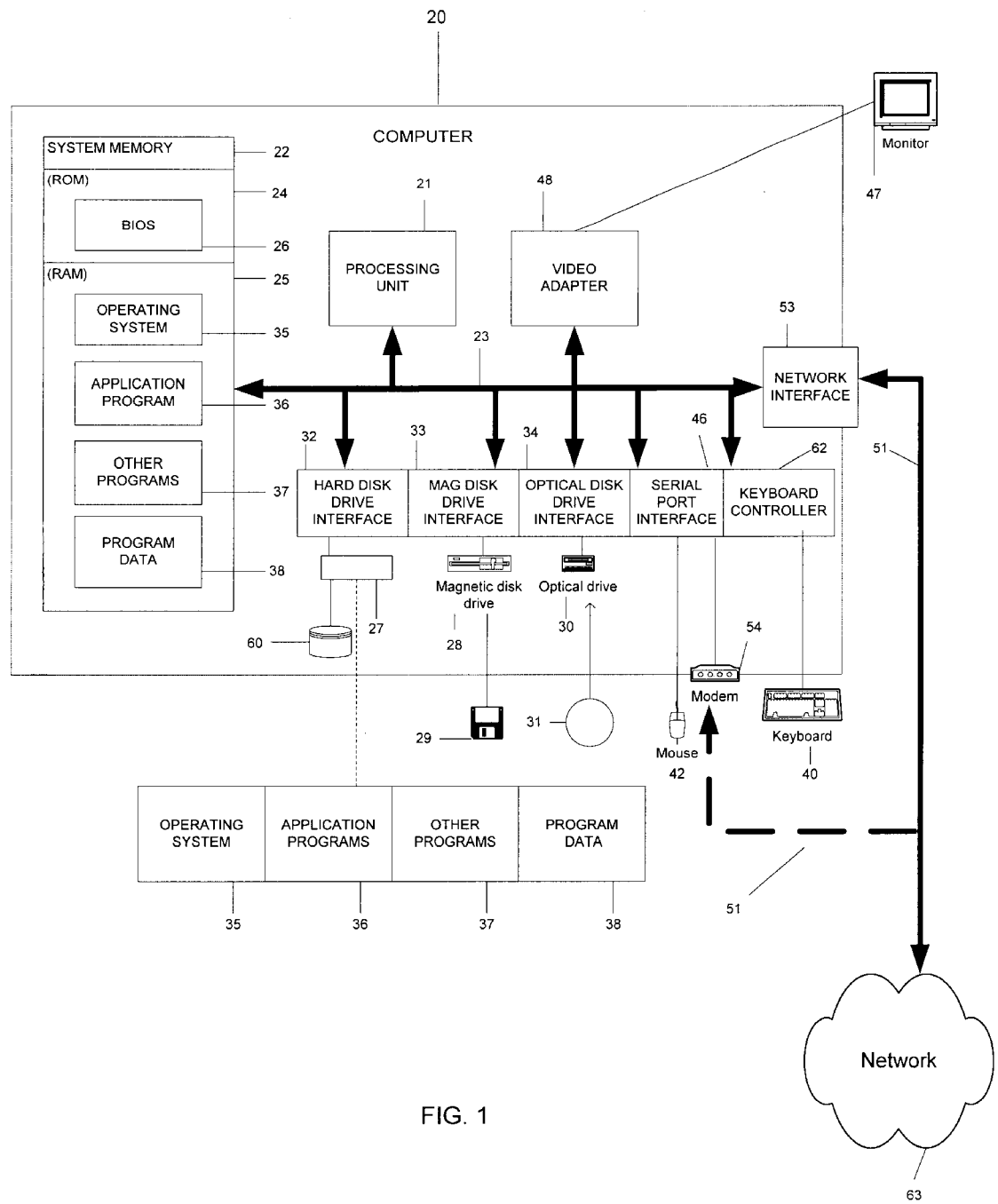
FIG. 1 is a block diagram generally illustrating an exemplary computer system for incorporating and carrying out the present invention.

Turning to the drawings, wherein like reference numerals refer to like elements, the invention is illustrated as being implemented in a suitable computing environment. Although not required, the invention will be described in the general context of computer-executable instructions, such as programs, being executed by a computer or similar device. Generally, programs include routines, other programs, objects, components, data structures, dynamic-linked libraries (DLLs), executable code, etc. that perform particular tasks or implement particular abstract data types. Moreover, those skilled in the art will appreciate that the term "computer" is not meant to limit the invention to personal computers, as the invention may be practiced on multi-processor systems, network devices, minicomputers, mainframe computers, and the like. The invention may also be practiced in distributed computing environments where tasks are performed by physically distinct processing devices that are communicatively linked. In a distributed computing environment, parts of a program may be located in both local and remote memory storage devices.

With reference to FIG. 1, an exemplary system for implementing the invention is shown. As best shown in FIG. 1, the system includes a general purpose computer in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory may include read only memory (ROM) 24 and random access memory (RAM) 25. A basic input/output system (BIOS) 26, containing the basic routines that help to transfer information between elements within the computer 20, such as during start-up, may be stored in the ROM 24. The computer 20 may further include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

If included in the computer 20, the hard disk drive 27, magnetic disk drive 28, and optical disk drive 30 may be connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of programs may be stored on the hard disk 60, magnetic disk 29, optical disk 31, ROM 24 or RAM 25, including an operating system 35, one or more applications programs 36, other programs 37, and program data 38. A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, satellite dish, scanner, or the like. Input devices as well as peripheral devices may be connected to the processing unit 21 through a serial port interface 46 that is coupled to the system bus, a parallel port, game port, universal serial bus (USB), 1394 bus, or other interfaces. A monitor 47 or other type of display device is also connected to the system bus 23 via an interface, such as a video adapter 48. In addition to the monitor, computers typically include other devices not shown, such as speakers and printers.

The computer 20 operates in a networked environment using logical connections to one or more devices within a network 63, including by way of example personal computers, servers, routers, network PCs, a peer device or other common network node. These devices typically include many or all of the elements described above relative to the computer 20.

Figure 2:
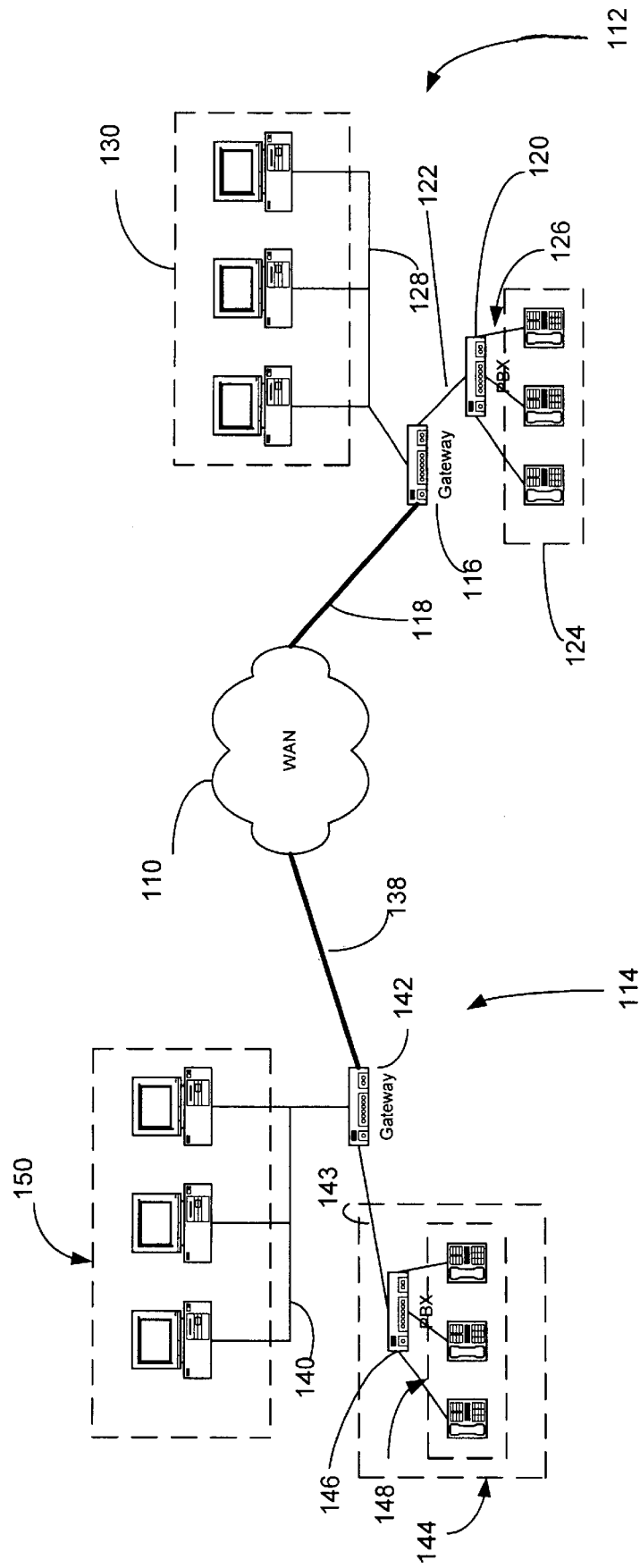
FIG. 2 is a schematic drawing depicting an exemplary network environment, including integrated voice and data communications links, in which the present invention is implemented.

The logical connections depicted in FIGS. 1 and 2 include one or more network links 51, for which there are many possible implementations, including local area network (LAN) links and wide area network (WAN) links. Such networking links are commonplace in offices, enterprise-wide computer networks, intranets and the Internet. It will be appreciated that the network connections shown are exemplary and other means of establishing a data path between the computers may be used. When used in a LAN, the computer 20 may be connected to the network 63 through a network interface or adapter 53. When used in a WAN, the computer 20 typically includes a modem 54 or other means for establishing communications over the network link 51, as shown by the dashed line in FIG. 1. The network link 51 may also be created over public networks, using technologies such as dial-up networking, the Internet, Digital Subscriber Line (DSL), Asynchronous Transfer Mode (ATM), Virtual Private Network (VPN) or any other conventional communication method. The modem 54 may be connected to the system bus 23 via the serial port interface 46, and may be external or internal. In a networked environment, programs depicted relative to the computer 20, or portions thereof, may be stored on other devices within the network 63.

In the description that follows, the invention will be described with reference to acts and symbolic representations of operations that are performed by one or more computers, unless indicated otherwise. As such, it will be understood that such acts and operations, which are at times referred to as being executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Turning now to FIG. 2, a schematic diagram depicts components of a communications network environment into which a new method for dynamically allocating throughput to connections may be incorporated in accordance with the present invention. The exemplary network includes a wide area network 110 providing physical linkage between a first private network 112 and a second private network 114. The first private network 112 includes a gateway 116 connected to a link 118 that supports voice and data calls. In another contemplated embodiment, the link 118 supports at least video and data calls, and preferably also supports voice calls.

A data call is processed though a network data architecture of a computer operating system (e.g., NDIS by MICROSOFT). Voice and video calls are not processed through the network data architecture of a computer operating system. Rather, they are handled by telephony processes at both the kernel and user mode levels. Examples of voice calls are fax, voice conversations, voice mail, etc. Voice and video calls are typically limited to a single communication channel or fixed bandwidth. Data calls typically expand to meet the supply of available throughput of the communication link.

The gateway 116, connects to a PBX hub 120 via a link 122. The PBX hub 120 is connected to a set of telephony equipment 124 via lines 126 (or video display monitors—not shown). The gateway 116 is also connected via an Ethernet link 128 to a local area computer network including a set of computing devices 130. The computing devices 130 comprise, for example, personal computers, servers, client terminals and workstations. While not shown in FIG. 1, those skilled in the art will understand that the gateway 116 is physically coupled to links 118, 122 and 128 via network interfaces including hardware and software adapted to transmit and receive data in accordance with the communications protocol for the associated links 118, 122 and 128.

The second private network 114, connected to the WAN 110 via link 138 includes network components similar to those of the first private network 112. Link 138 is connected to a gateway 142 and supports both voice/video and data calls. An Ethernet link 140 connects the gateway 142 to computing equipment 150. Gateway 142 is connected via link 143 to telephony equipment 144 (including a PBX hub 146 and telephones 148). Link 138 supports both voice/video and data transmissions. Gateway 142 is physically coupled to links 138, 140 and 143 via network interfaces including hardware and software adapted to transmit and receive data in accordance with the communications protocol for the associated links 138, 140 and 143.

FIG. 2 depicts an exemplary network configuration; however, those skilled in the art will readily appreciate from the disclosure herein that a multitude of network configurations incorporating the present invention are possible. In fact, convergence of data and voice/video communications expands the possibilities for potential networks that are not confined by the type of end nodes (e.g., phone, computer, fax machine, television, display monitor) connected to the network or even a same link on a network—such as both voice/video and data nodes on a single Ethernet link.

The links 118 and 138, in accordance with an embodiment of the present invention, are preferably circuit switched. In other words, any particular connection supported by the links 118 and 138 is assigned a channel or channels (or a range of bandwidth) from a set of available channels (or bandwidth ranges). However, in alternative embodiments of the present invention, connections via links 118 and 138 are identified by packet. The type of network protocols utilized within the private networks 112 and 114 may incorporate either circuit or packet switching.

Figure 3:
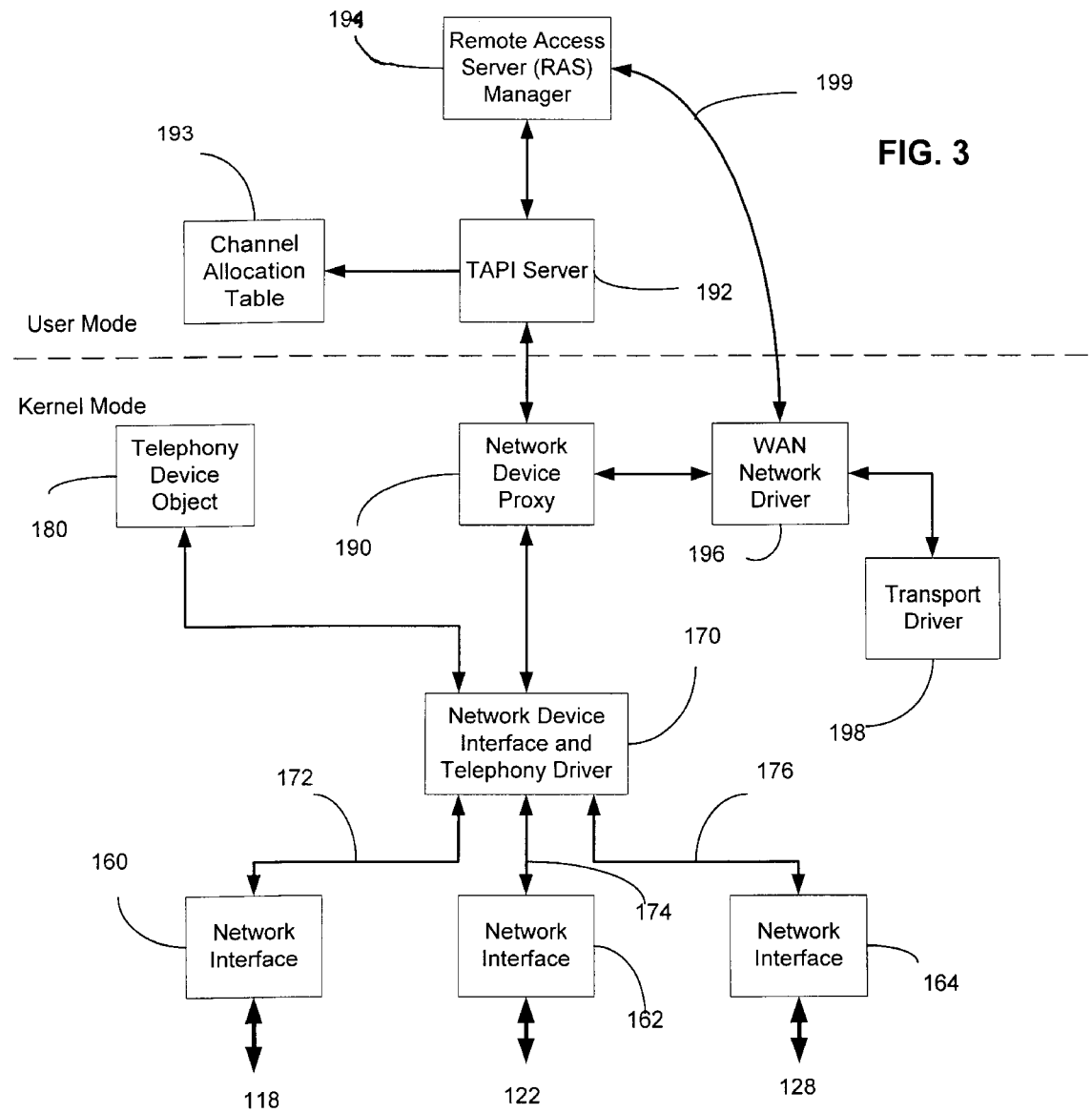
FIG. 3 is a schematic drawing of an exemplary interface between a public and a private network for implementing the present invention.

Having described a general network environment within which the present invention may be deployed, attention is directed to FIG. 3 which schematically depicts functional components of an exemplary gateway, such as gateway 116 embodying the present invention. The gateway 116 is physically coupled to links 118, 122 and 128 via network interfaces 160, 162, and 164. The hardware and software in network interfaces 160, 162, and 164 conform to the protocols of corresponding links 118, 122 and 128. Continuing with the description of FIG. 3, each of the network interfaces 160, 162 and 164 is communicatively coupled, via software and/or hardware links 172, 174 and 176 respectively, to a multipurpose driver 170 supporting both data and telephony/video connections. The multipurpose driver 170 distinguishes between voice/video calls and data calls and routes the requests to the proper kernel and application level processes within the gateway 116.

Telephone call connection requests are routed to a telephony device object 180. The telephony device object 180 makes interface calls to known Win32 application program interfaces. The Win32 API's in turn call higher level processes in the user level of the gateway 116 to perform connection-specific operations.

Data calls and voice calls are initially routed to a network device proxy 190. At the commencement of a call, the network device proxy 190 routes the call to a telephone application program interface server (TAPI Server) 192. Processes and tables within the TAPI Server 192, including a channel allocation table 193, in cooperation with a remote access service manager (RAS manager) 194 register the call, and in the case of data calls potentially create additional connections between the caller and server based upon the throughput requested for the data call and the availability of additional channels on the link 118. The throughput allocation processes are discussed herein below.

After registering the call and allocating the proper number of channels to the call, control of the remainder of the call session is directed to application-specific processes. In the case of a data call, the call is directed from the network device proxy 190 to a wide area network/network device interface 196. The WAN/network device interface 196 calls a transport layer driver 198 and thereafter executes the call by direct calls to the RAS manager 194 via path 199.

Figure 4:
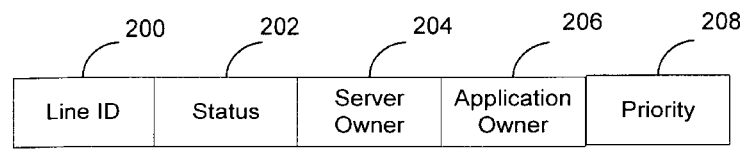
FIG. 4 is a diagram of an exemplary data structure for describing the status and ownership of an identified channel.

Turning now to FIG. 4, a set of fields (columns) are depicted for a channel allocation table in accordance with an embodiment of the present invention. Each row in the table corresponds to one of N channels supported by the network interface of the gateway 116 to the link 118. A line ID 200 represents one of the N potentially available channels. A status 202 is a multi-valued status variable including at least a free and a busy state notifying whether an identified line is available to be allocated to a new incoming or outgoing call. A server owner 204 and an application owner 206, together map the identified channel to a server and application. The server owner 204 and application owner 206 facilitate communication with the appropriate server and application processes when the status of the channel changes or an event occurs requiring the channel to be taken from the application and server to enable the channel to be reassigned to another application (call). This act comprises an aspect of dynamic throughput allocation in accordance with an embodiment of the present invention. A priority field 208 enables the operating system to establish an order to de-allocating lines in the event that additional calls are received necessitating de-allocation channels allocated to a data call consuming multiple channels.

While not specifically depicted in FIG. 4, other data structures supporting dynamic throughput allocation include a list of free channels as well as the number of free channels available. The list of channels and the total of free channels expedite decision making by the TAPI server 192 and RAS manager 194 when allocating free channels to requesting caller processes. In order to prevent erroneous decisions, mutual exclusion is practiced with regard to the line allocation data structures described above. The TAPI server 192 also maintains at least one channel request queue. The channel request queue comprises all of the pending calls that have pending requests for one or more channels. In an embodiment of the invention, multiple queues are maintained to implement a channel allocation scheme.

Figure 5:
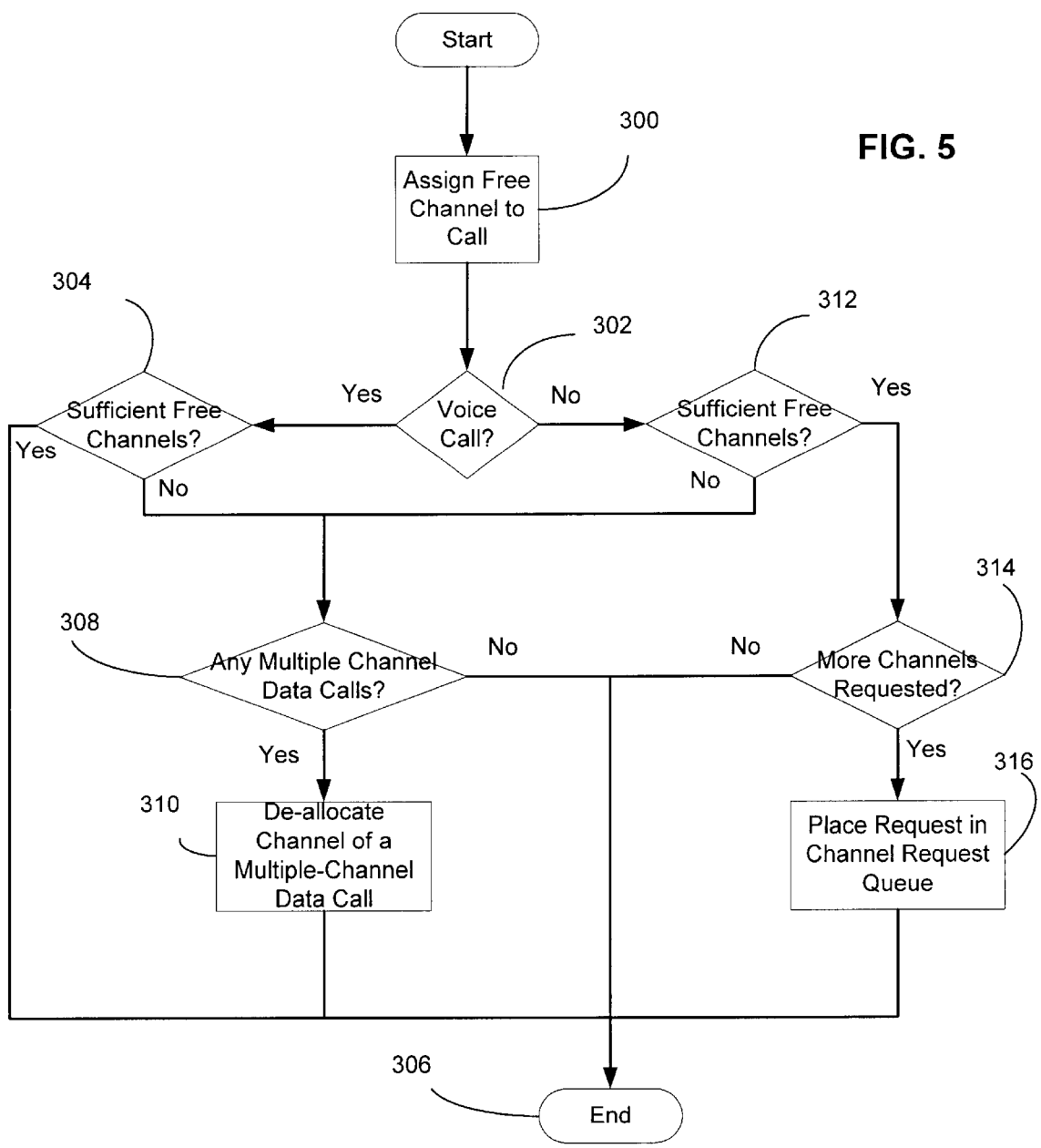
FIG. 5 summarizes the steps performed by an interface server/controller for dynamically allocating throughput to connections established between nodes residing on the public and private networks.

Having described an exemplary set of data structures for use in a gateway 116 embodying the present invention, attention is now directed to FIG. 5 that depicts the steps for allocating a channel to a requesting caller in accordance with an embodiment of the present invention. In response to receiving a request for one or more channels for a call, during step 300, the TAPI server 192 assigns a channel to the call. The request may arise from a hardware event such as receiving a call into the gateway 116 or from a software event such as a data call request for additional channels. During step 300, the channel assignment is registered in one of the rows of the channel allocation table 193.

Next, at step 302 if the call is a voice call, then control passes to step 304 wherein the TAPI server 192 determines whether sufficient free channels remain to establish additional calls. An appropriate video application server is called in instances of video calls. A minimum of one or two spare channels should remain if such is possible without actually terminating a voice/video or data call or blocking a new call. If at step 304 sufficient unassigned (free) channels remain, then control passes to the End 306.

If at step 304 sufficient channels do not remain, then control passes to step 308 wherein the TAPI server 192 determines whether any data calls have been assigned multiple channels. If no such channels remain, determined by referencing the channel allocation table, then control passes to the End 306. Otherwise, if at step 308 at least one data call is using multiple channels, then control passes to step 310 wherein the TAPI server 192 de-allocates a channel belonging to a multiple channel data call. The decision process for determining which channel of a set of potential channels to de-allocate is subject to many considerations and may be implemented in a number different ways. One such scheme for selecting a channel to de-allocate for a data call determines a lowest priority data call channel and de-allocates the channel. An object corresponding to the data call that lost a channel is updated to indicate a request by the data call for at least one channel when such channel becomes available. Priority itself may be determined a number of ways including by the number of channels assigned to a data call. In an embodiment of the present invention, a channel assigned to a data call using the greatest number of channels is assigned lowest priority. After the channel is de-allocated and the relevant data structures and objects have been updated to reflect the channel de-allocation event, control passes from step 310 to the End 306.

During step 302, if the call to which a new channel was assigned during step 300 is a data call, then control passes to step 312. At step 312 the TAPI server 192 determines whether sufficient free channels exist. If at step 312 insufficient channels exist after performing the allocation step 300, then control passes to step 308 described previously herein above. Otherwise control passes to step 314 wherein the TAPI server 192 determines whether any more channels have been requested for the data call. If more channels are not requested, then control passes to the End 306. If additional channels are requested, then the request is placed on the channel request queue during step 316. Control then passes to the End 306.

Figure 6:
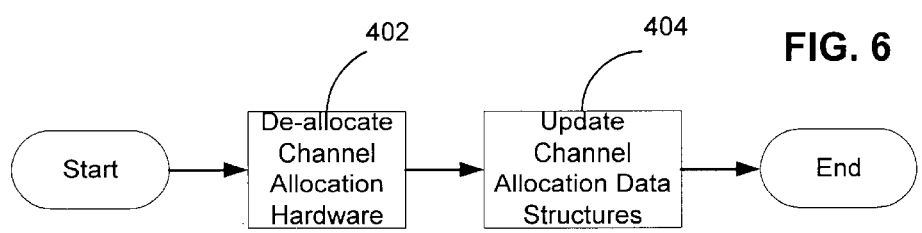
FIG. 6 summarizes the steps performed by an interface server/controller for de-allocating channels previously assigned to a call.

Turning briefly to FIG. 6, the steps are summarized for de-allocating a channel for any reason. Such reasons include the end of a call session and a forced de-allocation of a channel from a multiple channel data call to free up channels for other outgoing or incoming calls served by the gateway 116. During step 402, a de-allocation routine is invoked in the TAPI Server 192, and in response the TAPI Server 192 issues messages to the hardware interface to terminate a call on an identified channel (or channels). Alternatively, the hardware has already disconnected the particular channel(s) and the TAPI Server 192 is informed of the event during step 402. At the completion of step 402, the interface hardware of the gateway 116 is no longer supporting the prior existing call for the de-allocated channel(s). Next, at step 404, the TAPI server 192 is updated to reflect the freeing of a channel or channels (if a multi-channel data call is terminated) during step 404. The channel allocation table 193 is updated by clearing the call identification fields and setting the channel status to "free" for all de-allocated channels. Furthermore, while not specifically shown in the drawings, if a channel de-allocation has occurred because a data call is terminated, then the TAPI server 192 searches the queue of pending requests and requests by the terminated data call for additional channels within the queue are withdrawn from consideration within the queue.

Illustrative embodiments of the present invention and certain variations thereof have been provided in the Figures and accompanying written description. Those skilled in the art will readily appreciate from the above disclosure that many variations to the disclosed embodiment are possible including for example using alternative program and data structures. For example, while the throughput of the gateway is expressed in terms of channels, the throughput can alternatively be divided in a more flexible manner such as an expression of bandwidth allocated to a call at specified frequency ranges or time slots in a repeating time period divided into frames. Also, the order of performing the disclosed steps is subject to significant modification without departing from the scope of the present invention. This is especially true if mutual exclusion principles are applied to ensure that only a single event affecting channel allocation is processed at any given time. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims herein below.

What is claimed is:

1. A network gateway that dynamically allocates available throughput to enhance data transmission throughput on data calls while minimizing the risk of call blocking including the following:

a communications interface having a finite throughput;
   a multipurpose driver that distinguishes between data calls and non-data calls, and routes the calls to appropriate call processing modules; and
   a set of software components facilitating processing the data calls and non-data calls, the set of software components including:
      a throughput allocation server for assigning portions of the finite throughput to connections between ones of a first set of nodes connected to a first network served by the communications interface and ones of a second set of nodes connected to ones of the first set of nodes via the communications interface, wherein total throughput assigned to individual ones of the connections is variable, and wherein the throughput allocation server comprises:

a table describing the portions of the finite throughput assigned to each one of the connections; and a throughput allocation controller for monitoring available throughput, determining that available throughput is less than a minimum desired value, and in response:

de-allocating a portion of throughput previously allocated to a data call, and returning the portion to a pool of available throughput of the communications interface.

2. The apparatus of claim 1 wherein the communications interface supports at least data calls and voice calls.

3. The apparatus of claim 1 wherein the communications interface supports at least data calls and video calls.

4. The apparatus of claim 1 wherein the communications interface supports both fixed throughput calls and dynamic throughput calls.

5. The apparatus of claim 1 wherein the finite throughput is divided into a set of discrete channels having a fixed, equal magnitude.

6. The apparatus of claim 5 wherein the throughput is time divided.

7. The apparatus of claim 5 wherein the throughput is frequency divided.

8. The apparatus of claim 1 wherein the finite throughput is divisible into portions having varying magnitude.

9. The apparatus of claim 8 wherein the throughput is time divided.

10. The apparatus of claim 8 wherein the throughput is frequency divided.

11. A method for dynamically allocating available throughput within a gateway to maximize data transmission including the steps of:

connecting, by a communications interface of the gateway, a network link having a finite throughput and at least a first network served by the communications interface;

distinguishing, by a multipurpose driver, data calls and non-data calls associated with the at least a first network, and in response routing the calls to appropriate call processing modules; and processing the data calls and non-data calls the call processing modules including the further steps of:

assigning, by a throughput allocation server, portions of the finite throughput to connections between ones of a first set of nodes connected to the first network and ones of a second set of nodes connected to ones of the first set of nodes via the communications interface, wherein total throughput assigned to individual ones of the connections is variable, and wherein the throughput allocation server comprises:

a table describing the portions of the finite throughput assigned to each one of the connections, and a throughput allocation controller for monitoring available throughput; and determining, by the throughput allocation controller, that available throughput is less than a minimum desired value, and in response:

de-allocating a portion of throughput previously allocated to a data call, and returning the portion to a pool of available throughput of the communications interface.

12. The method of claim 11 wherein the communications interface supports at least data calls and voice calls.

13. The method of claim 11 wherein the communications interface supports at least data calls and video calls.

14. The method of claim 11 wherein the communications interface supports at least fixed throughput calls and dynamic throughput calls.

15. The method of claim 11 wherein the finite throughput is divided into a set of discrete channels having a fixed, equal magnitude.

16. The method of claim 15 wherein the throughput is time divided.

17. The method of claim 15 wherein the throughput is frequency divided.

18. The method of claim 11 wherein the finite throughput is divisible into portions having varying magnitude.

19. The method of claim 18 wherein the throughput is time divided.

20. The method of claim 18 wherein the throughput is frequency divided.

21. A computer-readable medium having computer executable instructions for facilitating dynamically allocating available throughput within a gateway to maximize data transmission by performing the steps of:

connecting, by a communications interface, a network link having a finite throughput and at least a first network served by the communications interface;

distinguishing, by a multipurpose driver, data calls and non-data calls associated with the at least a first network, and in response routing the calls to appropriate call processing modules; and processing the data calls and non-data calls by the call processing modules including the further steps of:

assigning, by a throughput allocation server, portions of the finite throughput to connections between ones of a first set of nodes connected to the first network and ones of a second set of nodes connected to ones of the first set of nodes via the communications interface, wherein total throughput assigned to individual ones of the connections is variable, and wherein the throughput allocation server comprises:

a table describing the portions of the finite throughput assigned to each one of the connections, and a throughput allocation controller for monitoring available throughput; and determining, by the throughput allocation controller, that available throughput is less than a minimum desired value, and in response:

de-allocating a portion of throughput previously allocated to a data call, and returning the portion to a pool of available throughput of the communications interface.

* * * * *